(12) United States Patent
Umeda et al.

(10) Patent No.: US 7,102,364 B2
(45) Date of Patent: Sep. 5, 2006

(54) CAPACITANCE DETECTING CIRCUIT AND DETECTING METHOD, AND FINGERPRINT SENSOR EMPLOYING THE SAME

(75) Inventors: Yuichi Umeda, Miyagi-ken (JP); Tatsumi Fujiyoshi, Miyagi-ken (JP); Ken Kawahata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 68 days.

(21) Appl. No.: 10/981,871

(22) Filed: Nov. 4, 2004

(65) Prior Publication Data
US 2005/0122785 A1 Jun. 9, 2005

(30) Foreign Application Priority Data
Nov. 6, 2003 (JP) .............................. 2003-376673

(51) Int. Cl.
*G01R 27/26* (2006.01)

(52) U.S. Cl. ....................................... 324/658; 324/662

(58) Field of Classification Search ..................... None
See application file for complete search history.

(56) References Cited

U.S. PATENT DOCUMENTS 5,343,157 A * 8/1994 Deschamps ................. 324/678

2003/0174871 A1 9/2003 Yoshioka et al.

FOREIGN PATENT DOCUMENTS

| EP | 0600148 A1 | 6/1993 |
| EP | 0715153 A1 | 6/1996 |
| JP | 11-118415 | 4/1999 |

* cited by examiner

*Primary Examiner*—Vincent Q. Nguyen
(74) *Attorney, Agent, or Firm*—Beyer, Weaver & Thomas

(57) ABSTRACT

A capacitance detecting circuit detects, in terms of voltage, change in capacitance at intersections of a plurality of column lines and a plurality of row lines crossing each other. The capacitance detecting circuit includes a column-line driving unit for driving a column line; a row-line selector for selecting a specific row line from the plurality of row lines; and a capacitance calculator for calculating a capacitance at an intersection of the specific row line and the driven column line based on a reference current that flows in relation to a reference capacitance and a current that flows in relation to the capacitance at the intersection.

9 Claims, 10 Drawing Sheets

CAPACITANCE DETECTING CIRCUIT AND DETECTING METHOD, AND FINGERPRINT SENSOR EMPLOYING THE SAME

BACKGROUND OF THE INVENTION

1. Field of the Invention

The present invention relates to a capacitance detecting circuit and detecting method for detecting a small capacitance, and to a fingerprint sensor employing the same.

2. Description of the Related Art

Hitherto, as a fingerprint sensor, which is considered as most promising among techniques of biometrics, a pressure-sensitive capacitance sensor of a type in which column lines and row lines are formed at a predetermined pitch on surfaces of two films, respectively, the films being disposed opposing each other via an insulating film or the like with a predetermined gap provided therebetween, has been developed. In the pressure-sensitive capacitance sensor, when a finger is placed, the shapes of the films change according to the ridges and valleys of the fingerprint, and the gap between the column lines and the row lines change according to the change in the shapes of the films. Thus, the form of the fingerprint is detected as small changes in capacitances at the intersections of the column lines and the row lines. In the pressure-sensitive capacitance sensor described above, a small change in capacitance less than several hundred fF (femtofarads) must be detected at each of the intersections of the matrix of the column lines and the row lines. Thus, regarding a capacitance detecting circuit of the capacitor sensor, a demand for high sensitivity exists since the change in capacitance is small, and a demand exists for insusceptibility to noise that is transmitted from a human body or noise that occurs in circuitry and for insusceptibility to crosstalk between column lines or between row lines.

In a capacitance detecting circuit of the type described above, adjacent detecting lines of capacitors (sensor elements) are respectively connected to a non-inverting input terminal and an inverting input terminal of a differential amplifier circuit, and the difference between voltage values of detection signals of the detecting lines is amplified, so that noise superposed on the detection signals is cancelled to a certain extent, suppressing the effect of the noise. Such a circuit is disclosed, for example, in Japanese Unexamined Patent Application Publication No. 11-118415 paragraphs [0011] to [0064] and FIG. 2).

In the capacitance detecting circuit, at a plurality of small capacitors (sensor elements) disposed on a row-by-row basis, the small capacitors are charged and discharged by a charge amp circuit, and differential detection is carried out for adjacent small capacitances on each row.

At this time, on each row of small capacitors, the combination of capacitors for differential detection is sequentially changed, allowing two-dimensional detection of capacitances.

The measurement techniques for differential detection can be applied to a capacitance detecting circuit of a sensor in which column lines and row lines cross each other and sensor elements are disposed in a matrix shape. Measurement signals of adjacent row lines are input to a non-inverting input terminal and an inverting input terminal of a differential amplifier to detect a differential component of charging or discharging associated with a driving pulse of a column line, so that reduction in noise due to crosstalk between row lines is expected.

However, in the conventional capacitance detecting circuit described above, the arrangement is such that a difference in voltage or current based on capacitances of adjacent sensor elements is detected.

Since the conventional capacitance detecting circuit lacks a reference for a subject of measurement, the level of a detection signal is determined by capacitances of adjacent detection lines, so that uniform detection is inhibited even in a single row. Thus, the mutual effect of the detecting lines is not fully eliminated, causing degradation in the resolution of detecting capacitance by the sensor elements.

Furthermore, in the conventional capacitance detecting circuit, although it is possible to decrease to a certain extent the effect of feed through of a sensor unit and switches respectively provided for the rows for introducing detection signals in a differential amplifier circuit, it is difficult to fully eliminate the effect of layout of lines or variation in stray resistance and stray capacitance of input selector.

Thus, the conventional capacitance detecting circuit has the drawback that it is not possible to obtain uniformly precise measurement results over the entire surface of a two-dimensional sensor such as an area sensor.

SUMMARY OF THE INVENTION

The present invention has been made in view of the situation described above, and an object thereof is to provide a capacitance detecting circuit and detecting method and a fingerprint sensor employing the same with which the effect of external noise is suppressed to improve S/N ratio, allowing detection at a sufficient sensitivity of a small capacitance Cs and a capacitance change ACs of the capacitance Cs at an intersection (sensor element) of a column line and a row line.

The present invention, in one aspect thereof, provides a capacitance detecting circuit for detecting, in terms of voltage, change in capacitance at intersections of a plurality of column lines and a plurality of row lines crossing each other. The capacitance detecting circuit includes a column-line driving unit for driving a column line; a row-line selector for selecting a specific row line from the plurality of row lines; and a capacitance calculator for calculating a capacitance at an intersection of the specific row line and the driven column line based on a reference current that flows in relation to a reference capacitance and a current that flows in relation to the capacitance at the intersection.

With this arrangement, in the capacitance detecting circuit, change in capacitance at intersections (sensor elements) of driven column lines and row lines is calculated by a predetermined calculation using the reference capacitance, thereby obtaining measurement data individually for each of the row lines (detecting lines). Thus, the effect of variation among capacitances of the respective detecting lines, layout of lines, and variation in stray resistance and stray capacitance of input selector can be removed, and noise superposed on detection signals of the detecting lines can be removed.

In the capacitance detecting circuit according to the present invention, preferably, the row-line selector selects a first row line and a second row line adjacent to each other, and the capacitance calculator includes a differential-voltage outputting unit for amplifying a difference between values of currents corresponding to capacitances at respective intersections associated with the first and second row lines, and outputting the amplified difference as a differential voltage signal; and a calculator for calculating values of voltages corresponding to the capacitances at the respective intersections based on differential voltage signals sequentially input to the calculator.

With this arrangement, in the capacitance detecting circuit, change in capacitance at intersections (sensor elements) of driven column lines and row lines is sequentially separated into measurement data for the respective row lines (detecting lines) by a predetermined calculation using the reference capacitance or an intersection whose capacitance is detected by comparison with the reference capacitance. Thus, the effect of external noise propagated from a human body or the like is suppressed effectively, the effect of variation among capacitances of the respective detecting lines, layout of lines, and variation in stray resistance and stray capacitance of input selector can be removed, and noise superposed on detection signals of the detecting lines can be removed.

In the capacitance detecting circuit, preferably, the row-line selector, in a first detecting period, selects a line connected to the reference capacitance as a first row line, and a row line adjacent to the first row line as a second row line, the row-line selector, in and after a second detecting period, selects row lines adjacent to each other from the plurality of row lines as first and second row lines, and the calculator cumulatively adds differential voltage signals sequentially input thereto, thereby obtaining voltage values corresponding to capacitances at intersections.

In the capacitance detecting circuit, preferably, the row-line selector, in and after the second detecting period, sequentially selects row lines adjacent to each other as first and second row lines, successively to the first and second row lines selected in the first detecting period.

With this arrangement, in the capacitance detecting circuit, in a measurement of change in capacitance at intersections (sensor elements) of driven column lines and row lines, a difference value between measured voltages relating to the reference capacitor and a row line adjacent to the reference capacitor is obtained by a differential amplifier, then a difference between measured voltages relating to the first row line and a second row line adjacent to the first row line is obtained, and so forth, thereby sequentially determining difference values between measured voltages of each pair of adjacent row lines, and the difference values are cumulatively added. Thus, measured voltages relating to the respective row lines can be readily obtained by a simple calculation from a voltage value corresponding to the reference capacitance and voltage sums at the respective iterations of cumulative addition. Furthermore, noise superposed on detection signals of detecting lines can be removed.

In the capacitance detecting circuit according to the present invention, the plurality of row lines is divided into row-line groups, the row-line selector and the differential-voltage outputting unit are provided individually for each of the row-line groups, and the calculator calculates values of voltages corresponding to the capacitances at the intersections individually for each of the row-line groups.

With this arrangement, in the capacitance detecting circuit, cumulative addition of difference values of measurement data between each pair of adjacent row lines is restricted within the range of each row-line group. Thus, a cumulative value of detection error or the like, included in difference values, is reduced, allowing measurement of capacitances at intersections at a higher accuracy.

In the capacitance detecting circuit, preferably, the column-line driving unit outputs a signal that rises to a first voltage and then falls to a second voltage to the column line, and when the column line is driven by the first voltage, the differential-voltage outputting unit outputs a third voltage corresponding to a current that charges the capacitances at the intersections, and when the column line is driven by the second voltage, the differential-voltage outputting unit outputs a fourth voltage corresponding to a current that discharges the capacitances at the intersections.

With this arrangement, in the capacitance detecting circuit, by the differential calculation of measured voltages in rising periods and falling periods of driving pulses for driving the column lines, various offset or variation factors that cannot be removed by a differential amplifier circuit alone can be removed, allowing detection of capacitance at a high accuracy.

In the capacitance detecting circuit, preferably, the row-line selector selects, as the specific row line, a row line connected to an intersection that is a subject of measurement, and the capacitance calculator includes a row-voltage outputting unit for converting a value of a current that flows in relation to a capacitance at the intersection into a value of a measured voltage, and outputting the value of the measured voltage; a reference-row-line selector for selecting row lines other than the specific row line; a reference-voltage generator for converting a value of a current that flows in relation to a reference capacitance into a value of a reference voltage, the reference capacitance being a sum of capacitances at a plurality of intersections of the other row lines and a driven column line, and for outputting the value of the reference voltage; and a calculator for amplifying a difference between the value of the measured voltage and the value of the reference voltage to calculate a value of a voltage corresponding to the capacitance at the intersection.

With this arrangement, in the capacitance detecting circuit according to the present invention, as described earlier, a sum of intersections of a driven column line and other row lines in the matrix is used as a reference capacitance against small change in capacitance at an intersection of the column line and a row line. Thus, by using the reference capacitance as a noise detector and correcting detection signals for the row lines, the effect of external noise propagated from a human body or the like can be suppressed effectively.

In the capacitance detecting circuit, preferably, an amplification factor of the reference-voltage generator is controlled to be substantially $1/(n-1)$ of an amplification factor of the row-voltage outputting unit, where n denotes the number of the row lines other than the specific row line.

With this arrangement, in the capacitance detecting circuit according to the present invention, a sum of intersections with other row lines in the matrix is used as a reference capacitance, by adjusting the magnitude of the reference capacitance and the level of noise component to values suitable for the capacitance at a subject intersection for detection, noise superposed on signals of the row lines due to crosstalk or the like can be removed more precisely.

The present invention, in another aspect thereof, provides a fingerprint sensor including the capacitance detecting circuit described above. In the fingerprint sensor, since change in capacitance at intersections (sensor elements) is detected using the capacitance detecting circuit, a fingerprint can be sampled at a high precision.

The present invention, in another aspect thereof, provides a capacitance detecting method for detecting, in terms of voltage, change in capacitance at intersections of a plurality of column lines and a plurality of row lines crossing each other. The capacitance detecting method includes a column-line driving step of driving a column line; a row-line selecting step of selecting a specific row line from the plurality of row lines; and a capacitance calculating step of calculating a capacitance at an intersection of the specific row line and the driven column line based on a reference current that flows in relation to a reference capacitance and a current that flows in relation to the capacitance at the intersection.

As described above, according to a capacitance detecting circuit of the present invention, an arrangement for removing noise of the same phase in a differential amplifier circuit and an arrangement for separating capacitances at respective intersections of a driven column line and row lines based on cumulative values of difference between each pair of adjacent row lines are both provided, so that a high resolution is achieved. Furthermore, since temporal differential amplification calculations involving rising and falling of column lines are combined, advantageously, it is possible to detect, at a high precision, a small capacitance at an intersection of a row line and a column line, or an amount of change in capacitance at an intersection.

Furthermore, according to a capacitance detecting circuit of the present invention, for example, when a fingerprint is detected, in order to remove noise component input from a human body or the like, instead of detection based on difference between adjacent row lines, a reference for calculating a difference value with outputs of the row lines (detecting lines) is provided separately from the row lines. Thus, measurement of capacitance at a high precision is allowed without decreasing resolution.

DESCRIPTION OF THE PREFERRED EMBODIMENTS

First Embodiment

Figure 1:
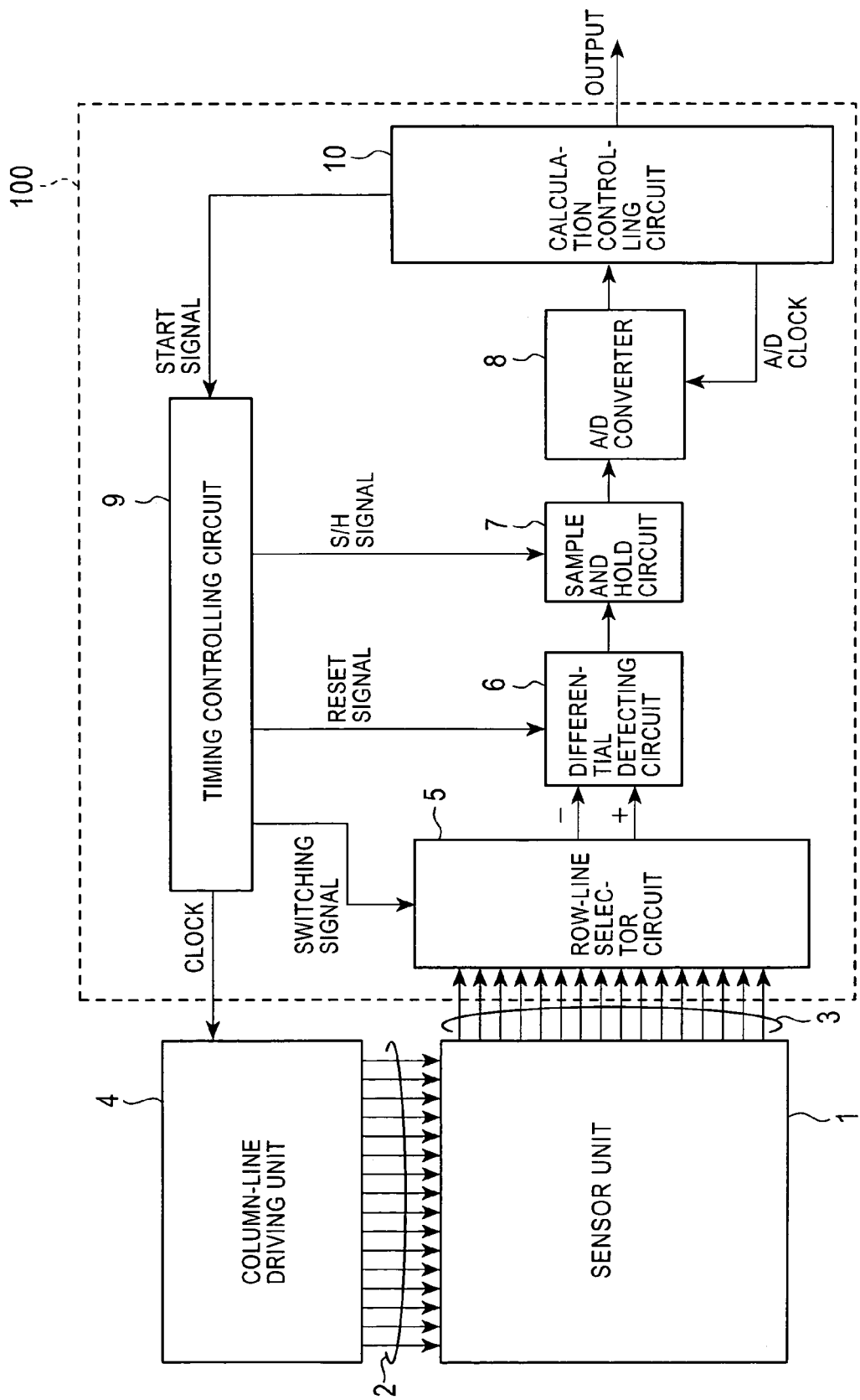
FIG. 1 is a block diagram showing an example configuration of a fingerprint sensor including a capacitance detecting circuit according to a first embodiment of the present invention.

A capacitance detecting circuit according to a first embodiment of the present invention will be described with reference to FIG. 1. FIG. 1 is a block diagram showing an example configuration of a capacitance detecting circuit according to the first embodiment.

Figure 4:
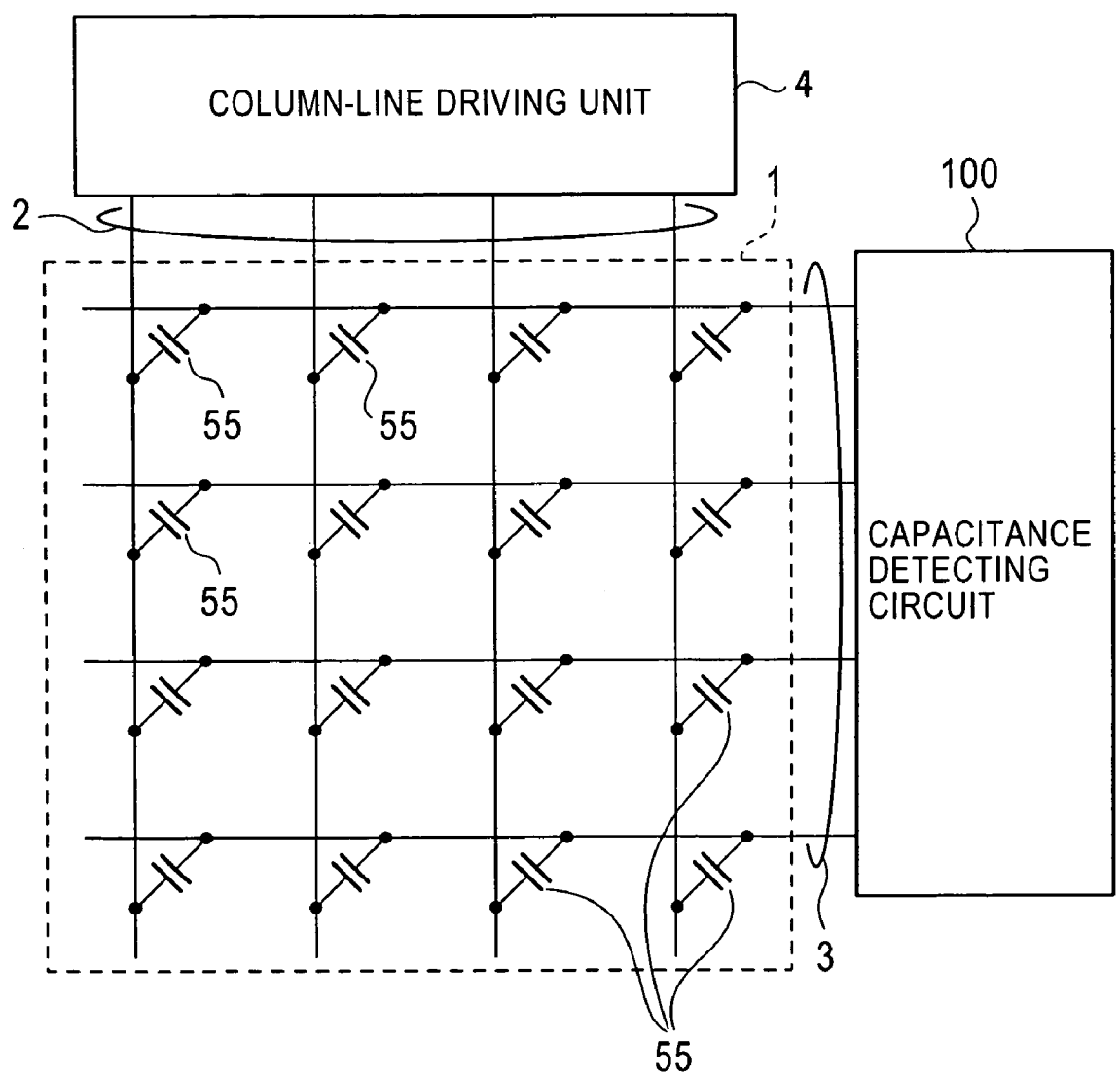
FIG. 4 is a schematic diagram showing an example configuration of sensor elements formed at the respective intersections of column lines of a column-line set and row lines of a row-line set in the sensor unit that is an area sensor.

In a sensor unit 1, a plurality of column lines of a column-line set 2 and a plurality of row lines of a row-line set 3 cross each other in a matrix form, the respective intersections forming sensor elements (sensor elements 55 in FIG. 4).

Figure 2A:
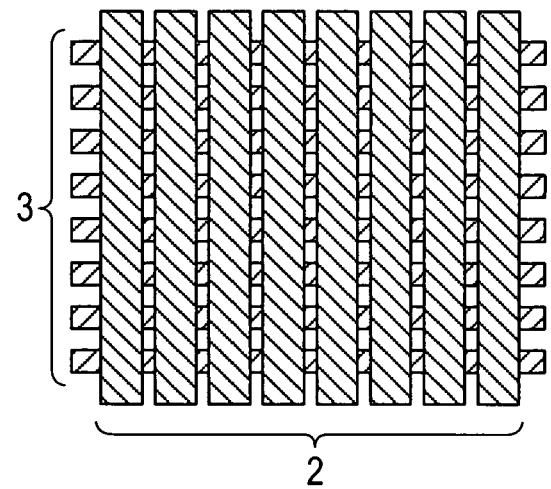
FIGS. 2A and 2B are schematic diagrams showing an example configuration of a sensor unit shown in FIG. 1.
Figure 2B:
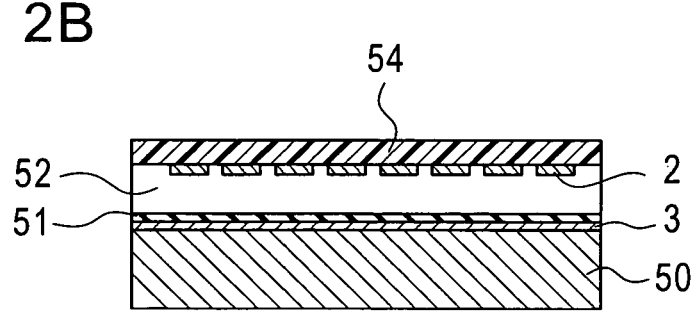

FIG. 2A is a plan view of the sensor unit 1, and FIG. 2B is a sectional view thereof. As shown in FIG. 2A, the column lines of the column-line set 2 and the row lines of the row-line set 3, arranged at a pitch of, for example, 50 μm, cross each other. As shown in FIG. 2B, the row-line set 3 including the plurality of row lines is disposed on a substrate 50. Over a surface of the substrate 50, an insulating film 51 is laminated, a film 54 is provided over a surface of the insulating film 51 with a gap 52, and the column-line set 2 including the plurality of column lines is attached on a lower surface of the film 54. At the intersections of the row lines of the row-line set 3 and the column lines of the column-line set 2, sensor elements are formed as capacitors having a predetermined capacitance via the gap 52 and the insulating film 51.

Figure 3:
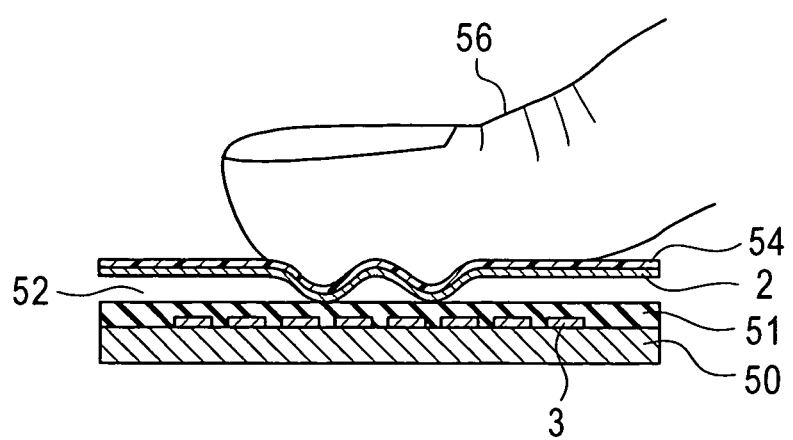
FIG. 3 is a schematic diagram for explaining measurement of fingerprint data using the sensor unit shown in FIG. 1.

When a finger 56 is placed on the sensor unit 1, as shown in FIG. 3, the shapes of the film 54 and column lines of the column-line set 2 are changed by the ridges and valleys of the finger 56, the gap 52 is changed, and accordingly the capacitances of sensor elements 55 formed at intersections of the column-line set 2 and the row-line set 3 are changed.

FIG. 4 is a schematic diagram showing the matrix of capacitors (sensor elements) between the column lines and the row lines of the sensor unit 1.

The sensor unit 1 includes a matrix of sensor elements 55, 55, . . . , and is connected to a column-line driving unit 4 and a capacitance detecting circuit 100 via the column lines and the row lines, respectively. That is, the column-line set 2 controlled by the column-line driving unit 4 and the row-line set 3 leading to a row-line selector 5 cross each other, the intersections forming the sensor elements 55.

The column-line driving unit 4 generates a driving pulse to be applied to the column lines, and supplies the driving pulse to a column line of the column-line set.

The capacitance detecting circuit 100 includes a differential detecting circuit 6, a sample and hold circuit 7, the row-line selector circuit 5, an A/D converter 8, a calculation controlling circuit 10, and a timing controlling circuit 9.

The capacitance detecting circuit 100 will now be described.

The row-line selector circuit 5 selects two row lines from the row-line set 3, and connects the selected row lines respectively to a non-inverting input terminal and an inverting input terminal of the differential detecting circuit 6.

The differential detecting circuit 6 converts currents into voltages, the currents being based on charges charged to or discharged from the capacitors at the intersections relevant to measurement, and detects a difference value between the non-inverting input terminal and the input terminal, outputting the difference value as a differential signal.

The sample and hold circuit 7, when a sample and hold (S/H) signal is input, temporarily holds a voltage level of the differential signal from the differential detecting circuit 6 as voltage information in synchronization with the sample and hold signal.

The A/D converter 8, in synchronization with an A/D clock input from the calculation controlling circuit 10, converts the voltage level held and output by the sample and hold circuit 7 into a digital value, outputting the digital value to the calculation controlling circuit 10.

The row-line selector circuit 5 is configured, for example, as shown in FIG. 5.

A reference capacitor R0 shown in FIG. 5 is a capacitive load whose accurate capacitance Cref is known and that serves as a reference for measurement of capacitances at intersections. The value of the reference capacitor R0 is chosen to be approximate (similar) to that of a row line.

The row-line selector circuit 5 includes a switch SW0 connected to the reference capacitor R0, and switches SW1, SW2, SW3, SW4, . . . respectively associated with row lines R1, R2, R3, R4, . . . of the row-line set 3. An output terminal S1 is connected to a negative input terminal IN(−) of the differential detecting circuit 6, and an output terminal S2 is connected to a positive input terminal IN(+) of the differential detecting circuit 6.

In the row-line selector circuit 5, the switch SW0 performs switching as to whether the reference capacitor R0 is to be connected to the output terminal S1 (a connected state) or to be floated (a disconnected state).

The switches SW1, SW2, SW3, SW4, . . . respectively perform switching as to whether the row lines R1, R2, R3, R4, . . . are to be floated, to be connected to the output terminal S1, or to be connected to the output terminal S2.

The timing controlling circuit 9 outputs to the row-line selector circuit 5 such switching signals that cause pairs of adjacent two row lines to be sequentially selected from the row lines of the row-line set 3 (as a pair of row lines to be measured), and that cause the respective switches SW0, SW1, SW2, SW3, SW4, . . . to be sequentially connected to one of the output terminal S1 and the output terminal S2.

Figure 6:
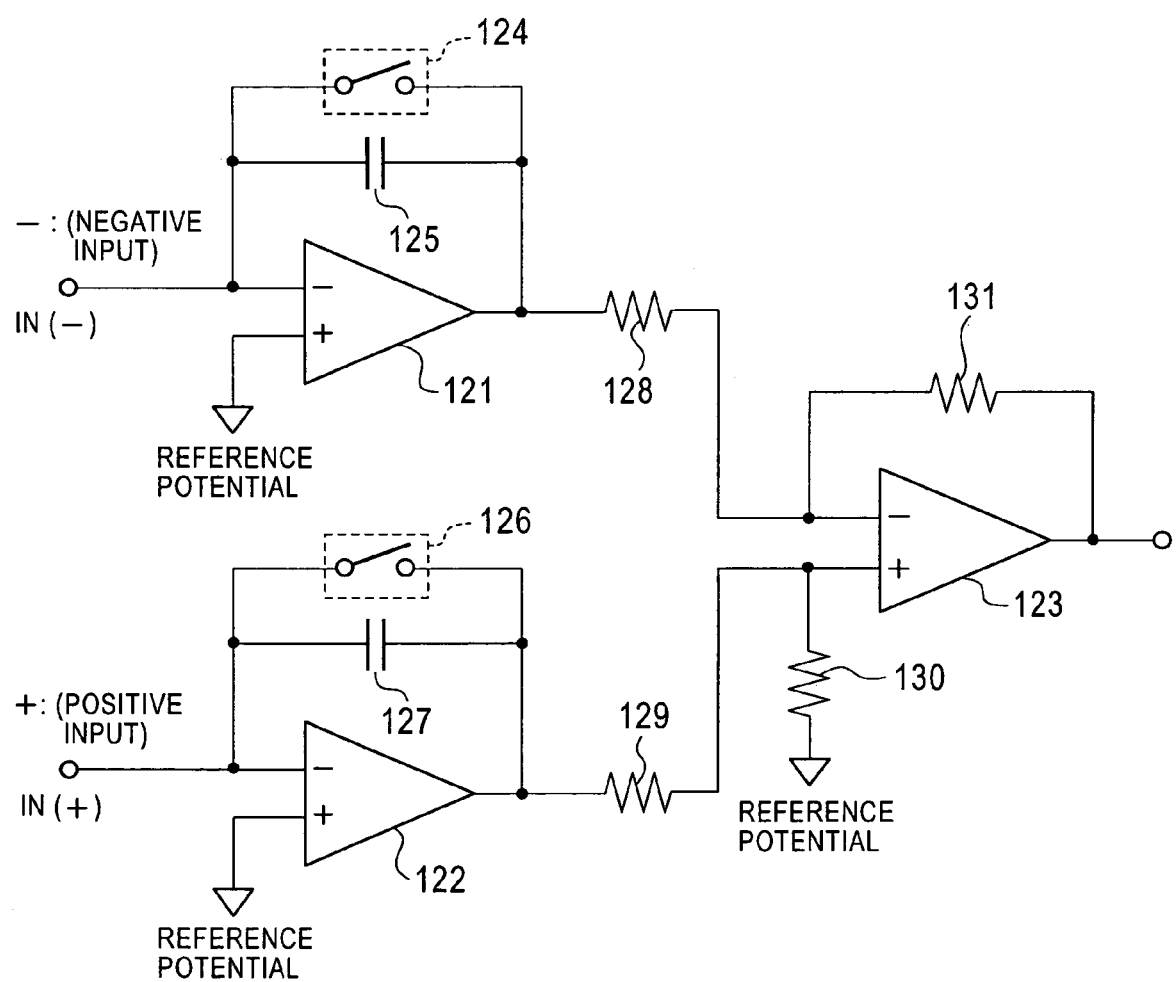
FIG. 6 is a schematic diagram showing an example configuration of a differential detecting circuit shown in FIG. 1.

Next, the differential detecting circuit 6 shown in FIG. 1 will be described with reference to FIG. 6. FIG. 6 is a block diagram showing an example configuration of the differential detecting circuit 6.

The differential detecting circuit 6 includes differential amplifiers 121, 122, and 123. The differential detecting circuit 6 converts currents into voltages, the currents respectively flowing in relation to capacitances at intersections and being input from the input terminals IN(−) and IN(+), and outputs a difference value between the voltages.

An inverting input terminal of the differential amplifier 121 is connected to an input terminal IN(−), an inverting input terminal of the differential amplifier 122 is connected to an input terminal IN(+), and a predetermined reference potential is supplied to non-inverting input terminals of the differential amplifiers 121 and 122.

The differential amplifier 121 converts a current input from the input terminal IN(−) into a voltage. Between the inverting input terminal and output terminal thereof, a feedback capacitor 125 and an analog switch 124 for discharging the feedback capacitor 125 are connected in parallel.

Similarly, the differential amplifier 122 converts a current input from the input terminal IN(+) into a voltage. Between the inverting input terminal and output terminal thereof, a feedback capacitor 127 and an analog switch 126 for discharging the feedback capacitor 127 are connected in parallel. The capacitor 125 and the capacitor 127 have the same capacitance Cf.

The output terminal of the differential amplifier 121 is connected to the inverting input terminal of the differential amplifier 123 via a resistor 128. The output terminal of the differential amplifier 122 is connected to the non-inverting input terminal of the differential amplifier 123 via a resistor 129.

The non-inverting input terminal of the differential amplifier 123 is connected to the reference potential via a resistor 130, and the inverting input terminal of the differential amplifier 123 is connected to the output terminal via a resistor 131. Thus, the differential amplifier 123 amplifies a difference value between output voltages of the differential amplifier 121 and the differential amplifier 122, by an amplification factor determined by the resistors 128, 129, 130, and 131.

Next, an example operation of the capacitance detecting circuit 100 according to the first embodiment, configured as described above, will be described with reference to FIG. 1.

Let it be supposed that a signal for starting detection of capacitance, i.e., a signal for sampling a fingerprint by the fingerprint sensor (the sensor unit 1), is input from outside to the calculation controlling circuit 10.

Then, the calculation controlling circuit 10 outputs a start signal requesting a start of detection to the timing controlling circuit 9. Then, the timing controlling circuit 9 sequentially outputs switching signals to the row-line selector circuit 5.

Then, the row-line selector circuit 5 sequentially switches the internal switches according to the switching signals sequentially input (correspondingly to measurements started from the respective timings).

Figure 5A:
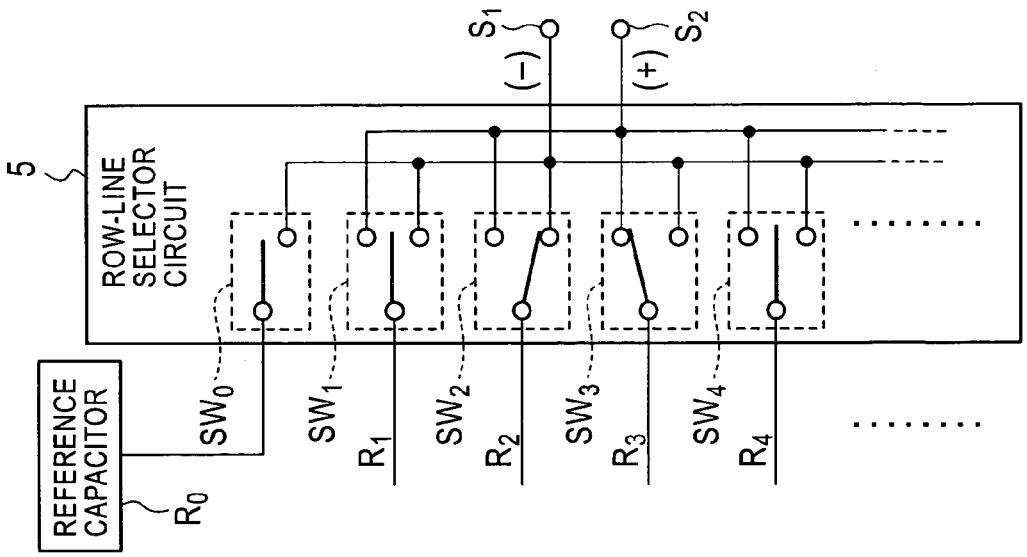
FIGS. 5A to 5C are schematic diagrams for explaining an example configuration and example operation of a row-line selector circuit shown in FIG. 1.

As shown in FIG. 5A, at time t1 (in a measurement that starts at time t1), in order to set a reference voltage level, the timing controlling circuit 9 outputs to the row-line selector circuit 5 such switching signals that cause the reference capacitor R0 having the known capacitance Cref to be connected to the output terminal S1 by the switch SW0, that cause the row line R1 to be connected to the output terminal S2 by the switch SW1, and that cause the other switches SW3, SW4, . . . to be floated.

Thus, the row-line selector circuit 5 connects the reference capacitor R0 to the output terminal S1 by the switch SW0, connects the row line R1 to the output terminal S2 by the switch SW1, and causes the other switches SW3, SW4, . . . to be floated.

Then, the timing controlling circuit 9 supplies a reset signal to the differential detecting circuit 6 and the column-line driving unit 4 to initialize the differential detecting circuit 6 and the column-line driving unit 4, making initial setting so that the potentials of the reference capacitor R0 and the row line R1 are equalized and so that the column-line driving unit 4 outputs a driving pulse to the column line C1 of the column-line set 2 in synchronization with the clock input. Although not shown, the column-line set 2 includes a plurality of column lines C1, C2, . . . , which are sequentially selected in measurement so that driving pulses are output thereto.

Then, the timing controlling circuit 9 outputs a clock to the column-line driving unit 4 so that the column-line driving unit 4 outputs a driving pulse for driving a column line (causes the driving pulse to rise to H level).

Thus, the column-line driving unit 4 outputs a driving pulse to the column line C1 of the column-line set 2 in synchronization with the clock.

Then, the differential detecting circuit 6, based on the voltage level of the driving pulse applied, converts currents into voltages, the currents respectively flowing into the input terminals IN(−) and IN(+) in relation to the reference capacitor R0 and the capacitor at the intersection of the column line C1 and the row line R1, and calculates a difference value between the voltages, outputting the difference value as a measured voltage.

Then, the timing controlling circuit 9 outputs a sample and hold (S/H) signal to the sample and hold circuit 7 after a predetermined time elapses since the application of the driving pulse.

Thus, the sample and hold circuit 7, in synchronization with the sample and hold signal input thereto, temporarily holds the voltage level being output by the differential detecting circuit 6 (stores the voltage level as voltage information), and outputs a signal of the same voltage level to the A/D converter 8.

Then, the column-line driving unit 4 stops output of the driving pulse (causes the driving pulse to fall to L level) in synchronization with the sample and hold signal.

Then, the timing controlling circuit 9, after a predetermined time elapses since the output of the sample and hold signal, outputs a conversion signal to the calculation controlling circuit 10.

Then, the calculation controlling circuit 10 outputs an A/D clock to the A/D converter 8 in synchronization with the conversion signal.

Thus, the A/D converter 8, in synchronization with the A/D clock, converts the voltage level being input from the sample and hold circuit 7 into digital measurement data, outputting the measurement data to the calculation controlling circuit 10.

The measurement data can be expressed as:

$$d1 = V1 - Vref + Vofs$$

where V1 denotes the value of a voltage obtained by converting a current that flows through the row line R1 and that is input to the input terminal IN(+), Vref denotes the value of a voltage obtained by converting a current that flows through the reference capacitor, and Vofs denotes an offset value for representing output data as an unsigned 8-bit value (the number of bits is arbitrary).

Figure 5B:
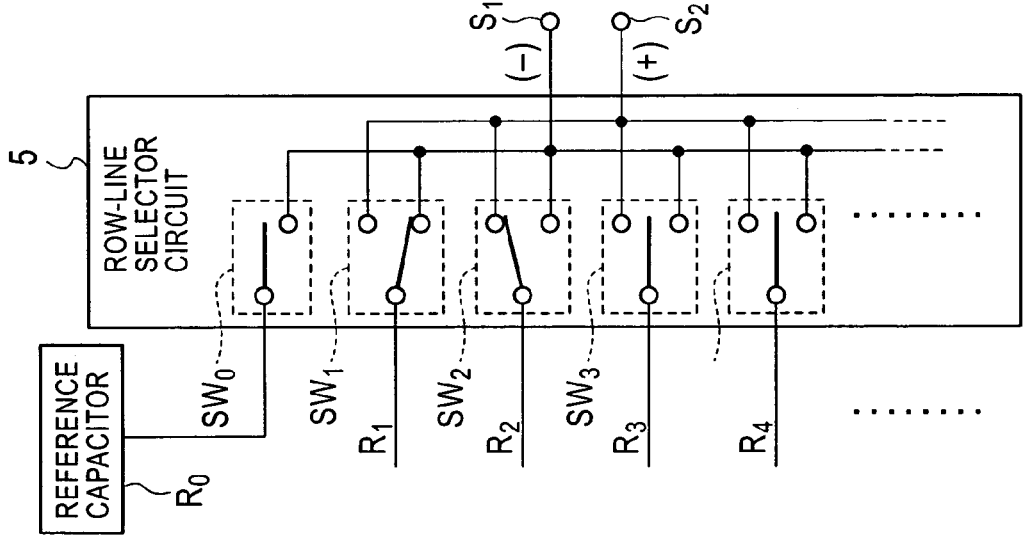

Next, as shown in FIG. 5B, at time t2 (in a measurement that stars at time t2), in order to carry out measurement for a next pair of row lines (i.e., a pair of adjacent row lines), the timing controlling circuit 9 outputs to the row-line selector circuit 5 such switching signals that cause the row line R1 to be connected to the output terminal S1 by the switch SW1, that cause the row line R2 to be connected to the output terminal S2 by the switch SW2, and that cause the other switches SW0, SW3, SW4, . . . to be floated.

Thus, the row-line selector circuit 5 connects the row line R1 to the output terminal S1 by the switch SW1, connects the row line R2 to the output terminal S2 by the switch SW2, and causes the other switches SW0, SW3, SW4, . . . to be floated.

Then, the timing controlling circuit 9 supplies a reset signal to the differential detecting circuit 6 to initialize the differential detecting circuit 6 so that the potentials of the row lines R1 and R2 are equalized.

Then, the timing controlling circuit 9 outputs a clock to the column-line driving unit 4 so that the column-line driving unit 4 outputs a driving pulse.

Thus, the column-line driving unit 4 outputs a driving pulse to the column line C1 of the column-line set 2 in synchronization with the clock.

Then, the differential detecting circuit 6, based on the voltage level of the driving pulse applied, converts currents into voltages, the currents respectively flowing into the input terminals IN(−) and IN(+) in relation to the capacitance at the intersection of the column line C1 and the row line R1 and the capacitance at the intersection of the column line C1 and the row line R2, and calculates a difference value between the voltages, outputting the difference value as a measured voltage.

Then, the timing controlling circuit 9 outputs a sample and hold signal to the sample and hold circuit 7 after a predetermined time elapses since the application of the driving pulse.

Thus, the sample and hold circuit 7, in synchronization with the sample and hold signal input thereto, temporarily holds the voltage level being output from the differential detecting circuit 6, and outputs a signal of the same voltage level to the A/D converter 8.

Then, the column-line driving unit 4 stops output of the driving pulse in synchronization with the sample and hold signal.

Then, the timing controlling circuit 9 outputs a conversion signal to the calculation controlling circuit 10 after a predetermined time elapses since the output of the sample and hold signal.

Then, the calculation controlling circuit 10 outputs an A/D clock to the A/D converter 8 in synchronization with the conversion signal.

Thus, the A/D converter 8, in synchronization with the A/D clock, converts the voltage level being input from the sample and hold circuit 7 into digital measurement data, outputting the measurement data to the calculation controlling circuit 10.

The measurement data can be expressed as:

$$d2 = V2 - V1 + Vofs$$

where V2 denotes the value of a voltage obtained by converting a current that flows through the row line R2 and that is input to the input terminal IN(+).

Figure 5C:
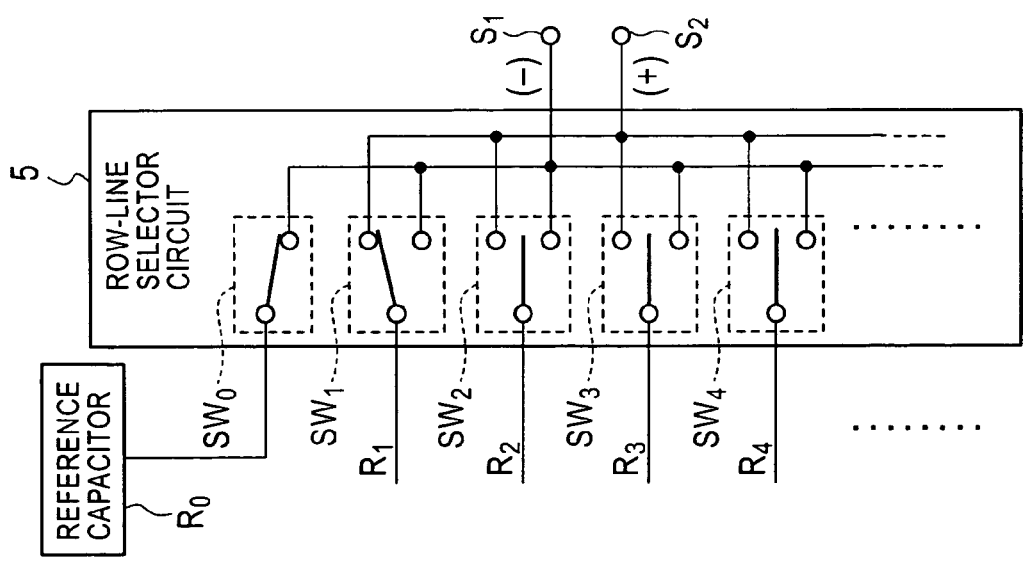

Similarly, as shown in FIG. 5C, at time t3, in a measurement that starts at time t3, in order to carry out measurement for a next pair of row lines, the timing controlling circuit 9 outputs to the row-line selector circuit 5 such switching signals that cause the row line R2 to be connected to the output terminal S1 by the switch SW2, that cause the row line R3 to be connected to the output terminal S2 by the switch SW3, and that cause the other switches SW0, SW1, SW4, . . . to be floated.

Thus, the row-line selector circuit 5 connects the row line R2 to the output terminal S1 by the switch SW2, connects the row line R3 to the output terminal S2 by the switch S3, and causes the other switches SW0, SW1, SW4, . . . to be floated.

Then, the timing controlling circuit 9 supplies a reset signal to the differential detecting circuit 6 to initialize the differential detecting circuit 6 so that the potentials of the row lines R2 and R3 are equalized.

The subsequent process is the same as the measurement process for time t2 except in that the pair of adjacent row lines selected for measurement is the row lines R2 and R3.

The A/D converter 8, in synchronization with the A/D clock, converts the voltage level being input from the sample and hold circuit 7 into digital measurement data, outputting the measurement data to the calculation controlling circuit 10.

The measurement data can be expressed as:

$$d3=V3-V2+Vofs$$

where V3 denotes a value obtained by converting a current that flows through the row line R3 and that is input to the input terminal IN(+).

The process described above is carried out until measurement is carried out for all the pairs of the row lines of the row-line set 3. That is, assuming that the row-line set 3 consists of n row lines R1 to Rn, measurement is started with a row-line pair of the reference capacitor R0 and the row line R1, and is continued until a row-line pair of the row line Rn-1 and the row line Rn, with the column line C1 activated by a driving pulse in measurement of each pair of row lines.

Thus, in the calculation controlling circuit 10, measurement data d1 to dn corresponding to the capacitances at the respective intersections of the column line C1 and the row lines R1 to Rn are stored in relation to the column line C1.

Assuming that the column-line set 2 consists of 15 column lines, the process described above is also executed for the other column lines C2 to C15 of the column-line set 2, carrying out measurement for pairs of adjacent row lines among the reference capacitor R0 and the row lines R1 to Rn to obtain measurement data associated with the respective column lines, which is stored in the calculation controlling circuit 10 in relation to the respective column lines.

When all the pairs of adjacent row lines among the reference capacitor R0 and the row lines R1 to Rn have been formed, i.e., when the row-line pair of the row line Rn-1 and Rn has been formed, the row-line selector circuit 5 outputs a signal indicating an end of row-line pairs to the timing controlling circuit 9.

Upon receiving input of the signal indicating the end of row-line pairs, the timing controlling circuit 9, before a next clock for the column-line driving unit 4, outputs a control signal to the column-line driving unit 4 so that the column-line driving unit 4 will subsequently output a driving pulse to the column line C2.

Thus, the timing controlling circuit 9, upon receiving a next clock, changes the combination of row-line pair among the row-line set 3 in synchronization with the clock, and outputs a driving pulse to the column line C2, similarly to the case of driving the column line C1, to measure capacitances at the respective intersections of the column line C1 and the row lines.

As described above, the calculation controlling circuit 10 sequentially drives all the column lines of the column-line set 2, and calculates voltage data corresponding to capacitances at the respective intersections from measurement data obtained when measurement of capacitances has been finished for the reference capacitor and the pairs of row lines of the row-line set 3.

The calculation controlling circuit 10 cumulatively adds measurement data obtained, individually for each of the column lines, thereby obtaining voltage data corresponding to capacitances at the respective intersections of the column lines and the row lines.

For example, the calculation controlling circuit 10 carries out calculation regarding capacitances at the respective intersections of the column line C1 and the row lines.

Let voltage data corresponding to the reference capacitance Cref be denoted as dr (i.e., Vref), measurement data corresponding to the capacitance at the intersection of the column line C1 and the row line R1 as d1 (measurement data at time t1, i.e., measurement data in a measurement that starts at time t1), and voltage data associated with the subject intersection as ds1. Then, the voltage data ds1 can be expressed as:

$$ds1=d1+dr=V1-Vref+Vofs+Vref=V1+Vofs$$

Similarly, let measurement data corresponding to the capacitances at the intersections of the column line C1 and the row lines R2 and R3 be denoted as d2 and d3, respectively, and voltage data associated with the subject intersections as ds2 and ds3, respectively.

$$ds2=d2+ds1=V2-V1+V1+Vofs=V2+Vofs$$

$$ds3=d3+ds2=V3-V2+V2+Vofs=V3+Vofs$$

By cumulatively adding measurement data sequentially in this manner, voltage values corresponding to the capacitances at the respective intersections can be obtained.

Although capacitance is measured only in rising periods of driving pulses (transition from a second voltage to a first voltage, the first voltage being larger than the second voltage) in the measurement described above, measurement may be carried out both in rising periods and falling periods (transition from the first voltage to the second voltage) of driving pulses so that unneeded offset is removed by temporal differential calculation, serving to improve precision of calculation.

Figure 7:
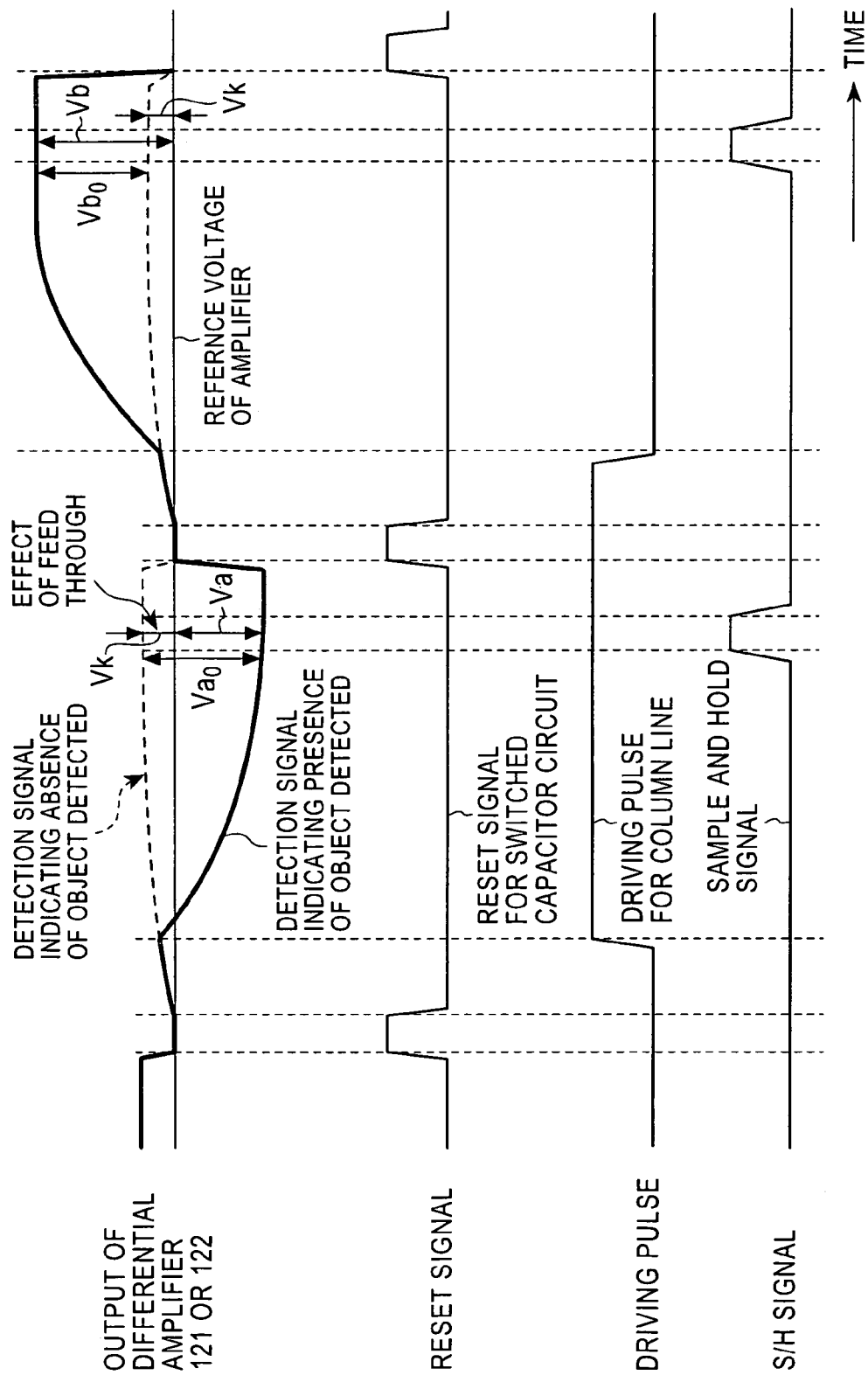
FIG. 7 is a waveform chart for explaining operations of differential amplifiers shown in FIG. 6.

More specifically, in the above-described measurement using only the rising periods of driving pulses, an offset Vk caused by a feed through current of the analog switch 124 (or 126) is generated in the positive direction when the output OUT decreases or increases from the reference potential, as shown in FIG. 7. FIG. 7 is a waveform chart showing an operation of the differential amplifier 121 (or 122). When the capacitance at an intersection to be detected is on the order of several ten to several hundred femtofarads as in this embodiment, the offset caused by the feed through is not negligible.

In the measurement relating to the reference capacitor R0 (measurement by the differential amplifier 121), the voltage that is proportional to the capacitance at an intersection to be detected can be expressed as:

$$-Vuref0=-Vuref+Vka$$

However, the voltage that is measured is Vuref, which includes an error Vk caused by an offset.

$$Vuref=Vuref0+Vka$$

Thus, in this embodiment, a voltage Vd1 at the time of discharging the capacitor Cs to be detected is measured. As a voltage Vd10 is expressed below, the voltage that is proportional to the capacitance Cs can be expressed as:

$$Vdref0=Vdref-Vka$$

and a voltage that is measured can be expressed as:

$$Vdref=Vdref0+Vka$$

Similarly, in a measurement relating to the row line R1 (measurement by the differential amplifier 122), a voltage that is proportional to the capacitance at an intersection to be detected is expressed as follows:

$$-Vu10=-Vu1+Vkb$$

However, the voltage that is measured is Vu1, which includes an error Vk caused by an offset, as expressed below:

$$Vu1=Vu10+Vkb$$

Thus, in this embodiment, a voltage vd1 at the time of discharging the capacitor Cs to be detected is also measured. As a voltage Vd10 is expressed below, the voltage that is proportional to the capacitance Cs can be expressed as:

$$Vd10 = Vd - Vkb$$

The voltage that is measured can be expressed as:

$$Vd1 = Vd10 + Vkb$$

Assuming an amplification factor of "1" in a rising period of a driving pulse, the differential detecting circuit 6 operates so that:

$$\begin{aligned} Vsu1 &= Vu1 - Vuref + Vof \\ &= Vu10 + Vkb - (Vuref0 + Vka) + Vof \\ &= Vu10 - Vuref0 + Vkb - Vka + Vof \end{aligned}$$

where Vof denotes an offset component of the A/D converter 8.

Similarly, in a falling period of a driving pulse, the differential detecting circuit 6 operates so that:

$$\begin{aligned} Vsd1 &= Vd1 - Vdref + Vof \\ &= Vd10 + Vkb - (Vdref0 + Vka) + Vof \\ &= Vd10 - Vdref0 + Vkb - Vka + Vof \end{aligned}$$

The measured voltages Vsu1 and Vsd1 are sequentially held by the sample and hold circuit 7, and the voltages are then A/D (analog/digital) converted by the A/D converter 8 into measurement data dsu1 and dsd1, respectively, which are stored in a memory of the calculation controlling circuit 10.

Then, the calculation controlling circuit 10 carries out the following calculation:

$$\begin{aligned} d1 &= dsd1 - dsu1 + Vofs \\ &= (vd10 - Vdref0 + Vkb - Vka + Vof) - \\ &\quad (Vu10 - Vuref0 + Vkb - Vka + Vof) + Vofs \\ &= Vd10 - Vu10 - (Vdref0 - Vuref0) + Vofs \end{aligned}$$

Thus, measurement data d, not including an offset error caused by a feed through current or an offset Vof caused during conversion by the A/D converter 8, is obtained. (Vofs denotes an offset value for filling output data by an unsigned 8-bit value (the number of bits is arbitrary)).

The subsequent process for obtaining voltage data ds corresponding to the capacitances at the respective intersections is the same as the method of cumulative addition described earlier.

In the above description, the capacitance detecting circuit 100 temporarily holds measurement data obtained by detection, and carries out calculation for obtaining voltage data corresponding to the capacitances at the respective intersections of the sensor unit 1 after completion of measurement of capacitance for all the column lines. However, the capacitance detecting circuit 100 may cumulatively add measurement data as soon as the measurement data is obtained and carry out calculation for obtaining voltage data concurrently (substantially simultaneously) with the operation for detecting capacitance.

Second Embodiment

Figure 8:
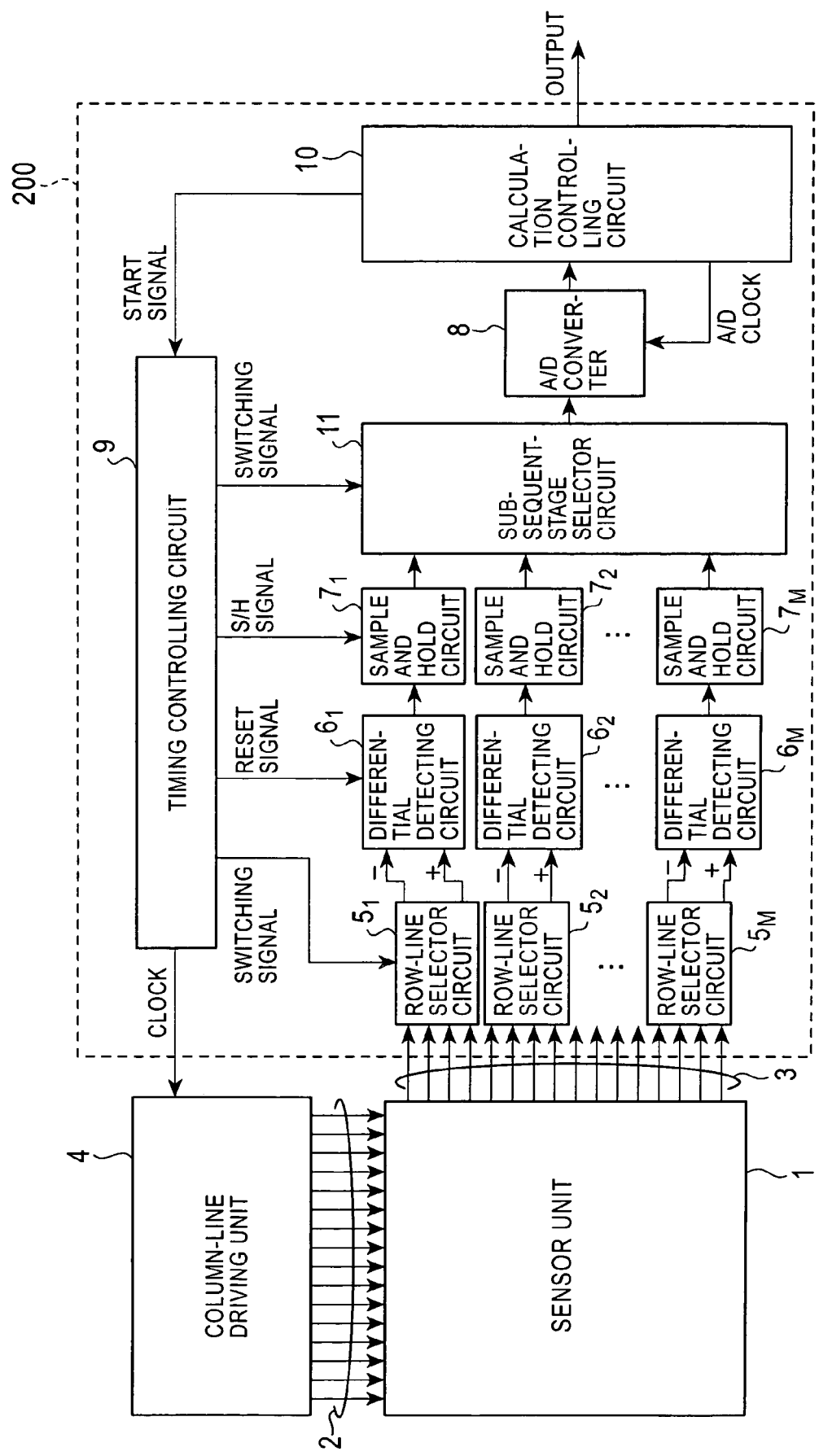
FIG. 8 is a lock diagram showing an example configuration of a fingerprint sensor including a capacitance detecting circuit according to a second embodiment of the present invention.

Now, a capacitance detecting circuit according to a second embodiment of the present invention will be described with reference to FIG. 8. FIG. 8 is a block diagram showing an example configuration of the capacitance detecting circuit according to the second embodiment. In FIG. 8, parts corresponding to those of the capacitor detecting circuit 100 according to the first embodiment shown in FIG. 1 are designated by the same numerals, and descriptions thereof will be omitted. A capacitor detecting circuit 200 shown in FIG. 8 differs from the first embodiment shown in FIG. 1 in that the row-line selector 5 is divided into M row-line selectors 51 to 5M.

That is, the row lines R1 to Rn of the row-line set 3 are divided into M groups, and the row-line selectors 51 to 5M are respectively associated with row-line groups to be controlled, each consisting of n/M row lines.

Thus, the row-line selectors 51 to 5M are respectively associated with differential detecting circuits 61, 62, . . . 6M, and sample and hold circuits 71 to 7M.

A subsequent-stage selector circuit 11 carries out switching as to which of the voltages levels held by the sample and hold circuits 71 to 7M is to be converted (A/D converted) into digital data.

Then, the timing controlling circuit 9 outputs a switching signal to the subsequent-stage selector circuit 11 according to the switching of the row-line selector circuits 51 to 5M.

In the second embodiment, the same measurements as in the first embodiment, i.e., the measurement of a difference value between voltages associated with the reference capacitor R0 and a row-line pair, and measurement of a difference value between each pair of adjacent row lines in each of the row-line selectors, are carried out individually for each of the row-line selectors 51 to 5M.

The timing controlling circuit 9, in addition to the switching signal for allowing the respective row-line selectors 51 to 5M to select row-line pairs, outputs switching signals for switching to a next row-line group of each of the row-line selectors when measurement of capacitance for all the row lines of a row-line group of the row-line selector has been finished.

Similarly to the first embodiment, the capacitor detecting circuit 100 may temporarily hold measurement data obtained by the process described above, carrying out calculation for obtaining voltage data corresponding to the capacitances at the respective intersections of the sensor unit 1 after the measurement of capacitance has been finished for all the column lines. Alternatively, the capacitance detecting circuit 100 may cumulatively add measurement data as the measurement data is obtained, carrying out calculation for obtaining voltage data concurrently (substantially simultaneously) with the operation for detecting capacitance.

After the measurement for row-line pairs has been finished, similarly to the first embodiment, the calculation controlling circuit 10 obtains voltage data corresponding to the capacitances at the respective intersections by cumulative addition. In the second embodiment, since cumulative addition is carried out individually by each of the row-line selectors, the number of iterations of the cumulative addition is reduced to 1/M compared with the first embodiment (compared with the case where the number of iterations for each column-line group is the entire row-line set 3), so that the accumulation of error is reduced.

Furthermore, with the arrangement described above, the number of row lines connected to the input terminal IN(+) and IN(−) of the differential amplifiers 61 to 6M is reduced by reconfiguration as row-line groups, so that improvement in the response speed and detection sensitivity of the differential detecting circuit 6 is expected.

Third Embodiment

Figure 9:
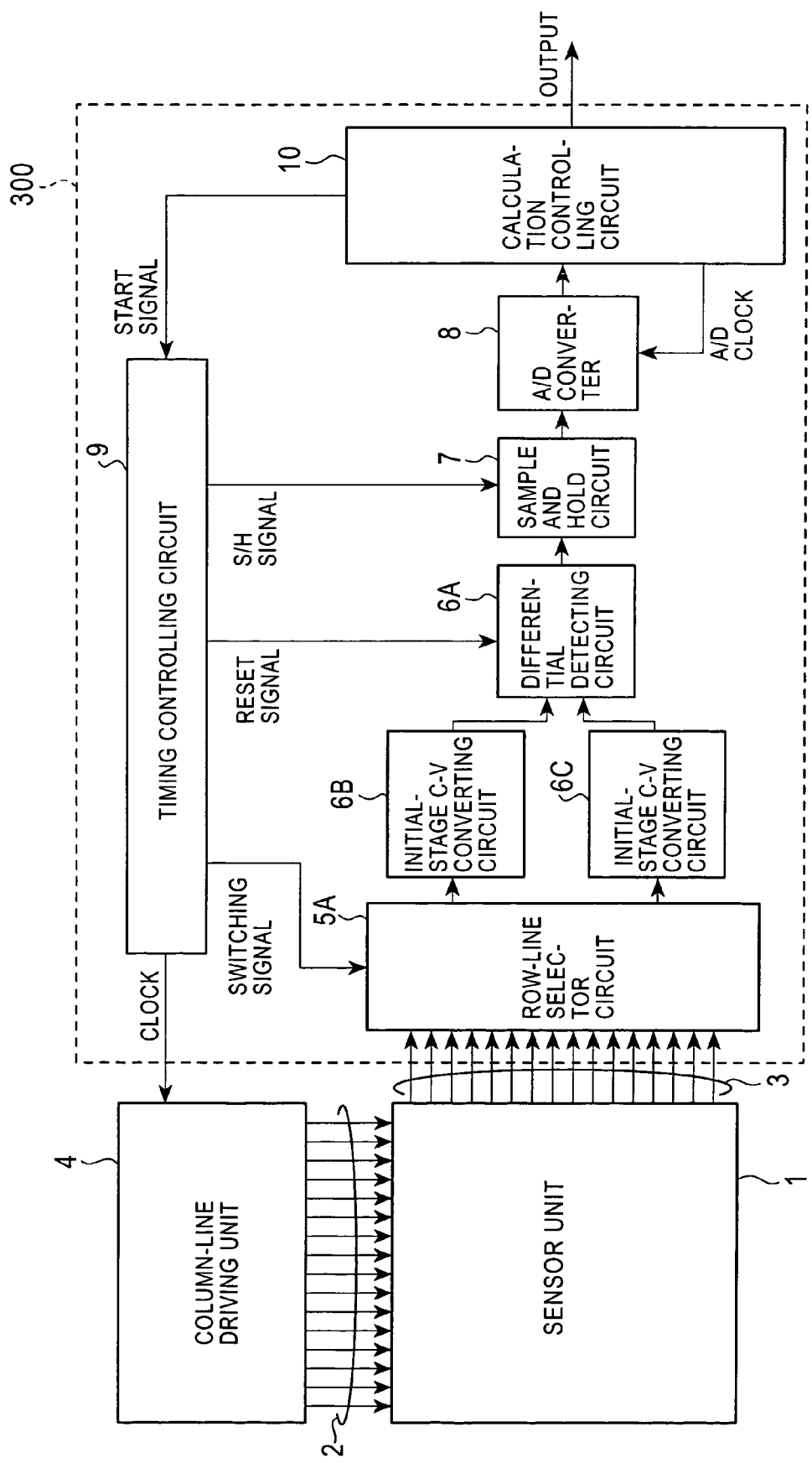
FIG. 9 is a block diagram showing an example configuration of a fingerprint sensor including a capacitance detecting circuit according to a third embodiment of the present invention.

A capacitance detecting circuit according to a third embodiment of the present invention will be described with reference to FIG. 9. FIG. 9 is a block diagram showing an example configuration of the capacitance detecting circuit according to the third embodiment. In FIG. 9, parts corresponding to those of the capacitance detecting circuit 100 according to the first embodiment shown in FIG. 1 will be designated by the same numerals, and descriptions thereof will be omitted. A capacitance detecting circuit 300 shown in FIG. 9 differs from the first embodiment shown in FIG. 1 in that as opposed to the first embodiment in which the reference capacitor R0 is provided to serve as a reference measurement voltage and is used as reference data for cumulative addition of measurement data, in the third embodiment, no special reference capacitor is provided, and row lines other than a subject row line for measurement in the row-line set 3 are connected to form a reference capacitor, so that the sum of capacitances of the row lines, i.e., the sum (combined value) of currents that flow through the respective row lines, is used as the value of a current that serves as the reference capacitor (a capacitor that serves as a reference), using the value for calculating capacitances of the row lines. This is based on the fact that averaging the values of current that flow through a plurality of row lines yields a substantially constant value.

Figure 10A:
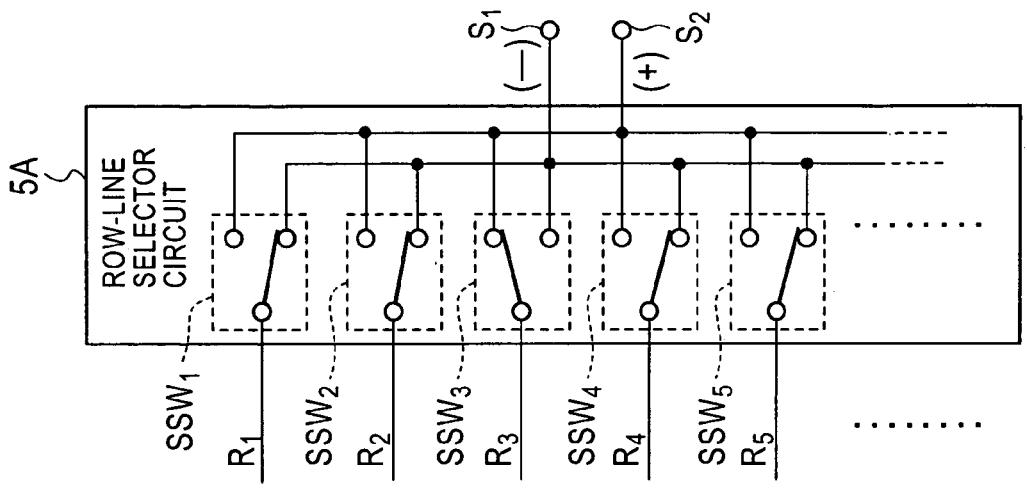
FIGS. 10A to 10C are block diagrams showing an example configuration of a row-line selector circuit shown in FIG. 9.
Figure 10B:
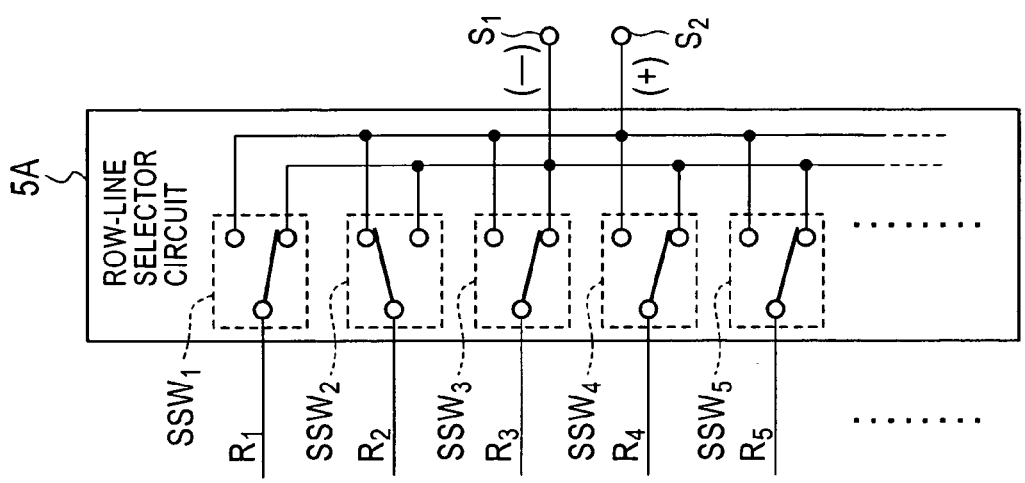
Figure 10C:
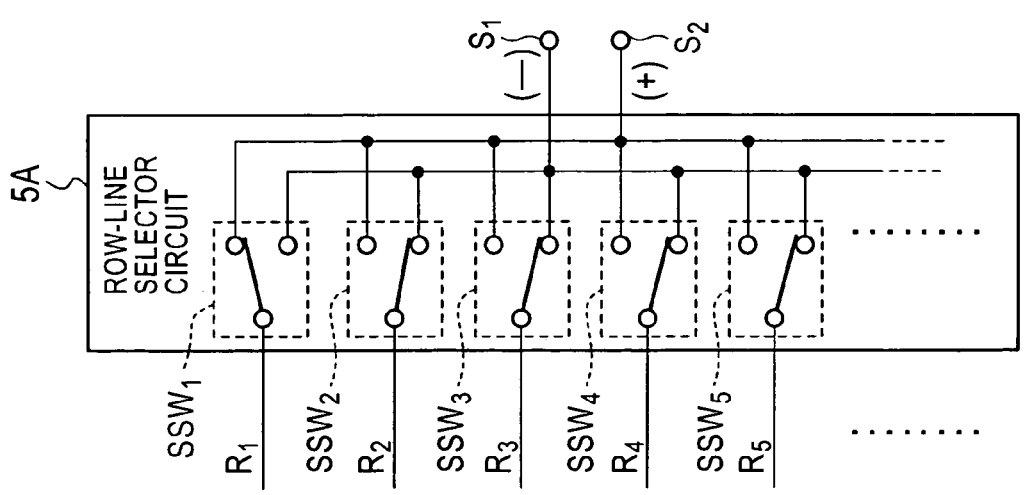

As shown in FIGS. 10A to 10C, the row-line selector circuit 5A includes switches SSW1 to SSW5, . . . that are controlled by the timing controlling circuit 9, and connects each of the row lines of the row-line set 3 to one of the output terminals S1 and S2.

That is, the switches SSW1 to SSW5, . . . are controlled by the timing controlling circuit 9 and are associated with the row lines R1 to R5, . . . respectively, and connect the respective row lines to one of the output terminals S1 and S2.

Figure 11:
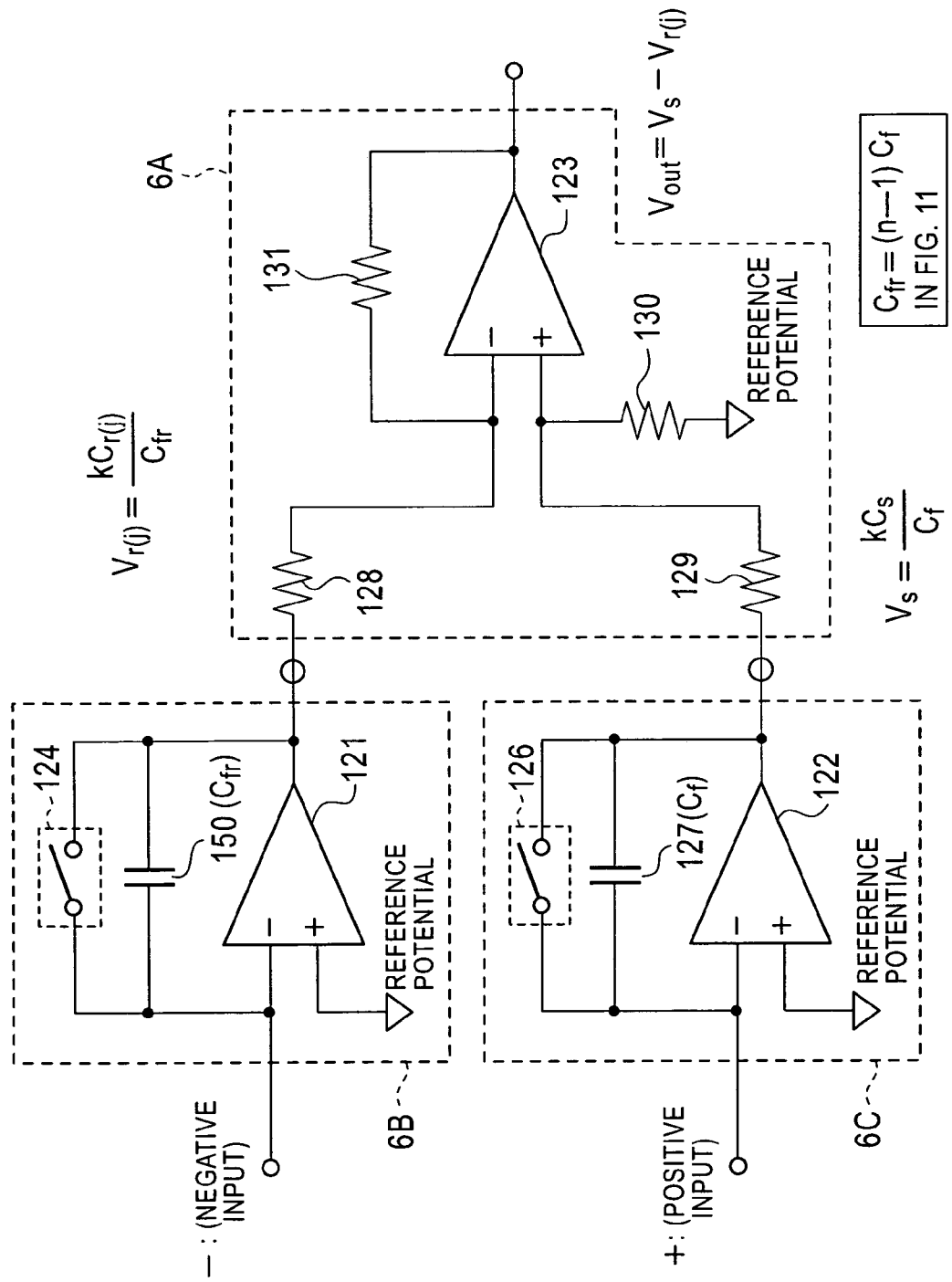
FIG. 11 is a block diagram showing an example configuration of a differential detecting circuit and initial-stage C-V converting circuits shown in FIG. 9.

Although the configuration of the differential detecting circuit 6 (in the first embodiment) shown in FIG. 6 and the configuration of a differential detecting circuit 6A and C-V converting circuits 6B and 6C shown in FIG. 11 are similar, the configurations differ with respect to the relationship between the capacitance of the capacitor 150 that serves as a feedback capacitor for the differential amplifier 121 and the capacitance of the capacitor 127 that serves as a feedback capacitor for the differential amplifier 122. In FIG. 11, parts corresponding to those in FIG. 6 are designated by the same numerals, and descriptions thereof will be omitted.

The initial-stage C-V converting circuit 6B corresponds to a converting circuit connected to the input terminal IN(−) of the differential detecting circuit 6 shown in FIG. 6, and the initial-stage C-V converting circuit 6C corresponds to a converting circuit connected to the input terminal IN(+) of the differential detecting circuit 6 shown in FIG. 6.

Regarding the relationship between the capacitance Cfr of the capacitor 150 and the capacitance Cf of the capacitor 127, since all the row lines other than a subject row line for measurement are connected to form a reference capacitor, in order to balance measurement of a current that flows through the subject capacitor for measurement and measurement of a current that flows through the reference capacitor, assuming that the row-line set 3 consists of n row lines, the capacitance Cfr is chosen so that:

$$Cfr \approx (n-1) \cdot Cf$$

Thus, increase in the voltage associated with the capacitor 150, caused by summing (n−1) currents, is adjusted to be a value equivalent to the voltage level of the capacitor 127, so that it is controlled to be a voltage that is used as a reference for measurement of voltage.

Next, an example operation of the capacitance detecting circuit according to the third embodiment, configured as described above, will be described with reference to FIG. 9.

Let is be supposed that a signal for starting detection of capacitance, i.e., a signal for sampling a fingerprint by the fingerprint sensor (the sensor unit 1), is input from outside to the calculation controlling circuit 10.

Thus, the calculation controlling circuit 10 outputs a start signal for requesting a start of detection to the timing controlling circuit 9. Then, the timing controlling circuit 9 sequentially outputs switching signals to the row-line selector circuit 5A.

The row-line selector circuit 5A sequentially switches of the internal switches according to the sequentially input switching signals.

As shown in FIG. 10A, at time t1, when the row line R1 is chosen as a subject row line for measurement, the timing controlling circuit 9 outputs to the row-line selector circuit 5A such switching signals that cause the row line R1 to be connected to the output terminal S2 by the switch SSW1, and that cause the other row lines of the row-line set 3 including the row lines R2 to R5 to be connecting to the output terminal S1 by the switches SSW2 to SSW5, . . . .

Thus, the row-line selector circuit 5A connects the subject row line R1 for measurement to the output terminal S2 by the switch SSW1, and connects the other row lines for which currents are summed to form a reference capacitor, including the row lines R2 to R5, to the output terminal S1.

Then, the timing controlling circuit 9 supplies a reset to the initial-stage C-V converting circuits 6B and 6C and the column-line driving unit 4 to initialize the initial-stage C-V converting circuits 6B and 6C and the column-line driving unit 4, making initial setting so that the potentials of the row lines R1 to R5, . . . are equalized and so that the column-line driving circuit 4 outputs a driving pulse to the column line C1 in synchronization with the clock input.

Then, the timing controlling circuit 9 outputs a clock to the column-line driving unit 4 so that the column-line driving unit 4 outputs a driving pulse for driving a column line (causing the driving pulse to rise to H level).

Thus, the column-line driving unit 4 outputs a driving pulse to the column line C1 of the column-line set 2 in synchronization with the clock.

Then, the initial-stage C-V converting circuits 6B and 6C converts currents into voltages, the currents flowing into the input terminals IN(−) and IN(+) in relation to the capacitances at the intersection of the column line C1 and the row line R1 and the intersections of the column line C1 and the row lines of the row-line set 3 other than the row line R1. The differential detecting circuit 6A calculates a difference value between the voltages, outputting the difference value as a measured voltage.

Then, the timing controlling circuit 9, after a predetermined time elapses since the application of the driving pulse, outputs a sample and hold (S/H) signal to the sample and hold circuit 7.

Thus, the sample and hold circuit 7, in synchronization with the sample and hold signal input thereto, temporarily holds the voltage level being output from the differential detecting circuit 6A (stores the voltage level as voltage information), and outputs a signal of the same voltage level to the A/D converter 8.

Then, the column-line driving unit 4 stops output of the driving pulse (causes the driving pulse to fall to L level) in synchronization with the sample and hold signal.

Then, the timing controlling circuit 9 outputs a conversion signal to the calculation controlling circuit 10 after a predetermined time elapses since the output of the sample and hold signal.

Then, the calculation controlling circuit 10 outputs an A/D clock to the A/D converter 8 in synchronization with the conversion signal.

Thus, the A/D converter 8, in synchronization with the A/D clock, converts the voltage level being input from the sample and hold circuit 7 into digital measurement data, outputting the measurement data to the calculation controlling circuit 10.

The measurement data can be expressed as:

$$d1 = V1 - Vr1 + Vofs$$

where V1 denotes a voltage obtained by converting a current that flows through the row line R1 and that is input to the input terminal IN(+), Vr1 denotes a reference value of voltage obtained by converting currents that flow through the row lines of the row-line set 3 other than the row line R1, and Vofs denotes an offset value for representing output data by an unsigned 8-bit value (the number of bits is arbitrary).

Then, as shown in FIG. 10B, at time t2, in order to carry out measurements relating to the intersections associated with the next row line R2, the timing controlling circuit 9 outputs to the row-line selecting circuit 5A such switching signals that cause the row line R2 to be connected to the output terminal S2 by the switch SSW2, and that cause all the row lines of the row-line set 3 other than the row line R2 to the output terminal S1 by the switches SSW1, SSW3 to SSW5, . . . .

Thus, the row-line selector circuit 5A connects the row line R2 to the output terminal S2 by the switch SSW2, and connects all the row lines of the row-line set 3 other than the row line R2 to the output terminal S1 by the switches SSW1, SSW3 to SSW5, . . . .

Then, the timing controlling circuit 9 supplies a reset signal to the initial-stage C-V converting circuit 6B and 6C to initialize the initial-stage C-V converting circuits 6B and 6C so that the potentials of the row lines R1 to R5, are equalized.

Then, the timing controlling circuit 9 outputs a clock to the column-line driving unit 4 so that the column-line driving unit 4 outputs a driving pulse for driving a column line.

Thus, the column-line driving unit 4 outputs a driving pulse to the column line C1 of the column-line set 2 in synchronization with the clock.

Then, the initial-stage C-V converting circuits 6B and 6C, based on the voltage level of the driving pulse applied thereto, convert currents into voltages, the currents flowing into the input terminals IN(−) and IN(+) in relation to the respective capacitances at the intersection of the column line C1 and the row line R1 and the intersection of the column line C1 and the row line R2. The differential detecting circuit 6A calculates a difference value between the voltages, outputting the difference value as a measured voltage.

Then, the timing controlling circuit 9 outputs a sample and hold signal to the sample and hold circuit 7 after a predetermined time elapses since the application of the driving pulse.

Thus, the sample and hold circuit 7, in synchronization with the sample and hold signal input thereto, temporarily holds the voltage level being output from the differential detecting circuit 6A, and outputs a signal of the same voltage level to the A/D converter 8.

Then, the column-line driving unit 4 stops output of the driving signal in synchronization with the sample and hold signal.

Then, the timing controlling circuit 9 outputs a conversion signal to the calculation controlling circuit 10 after a predetermined time elapses since the output of the sample and hold signal.

Then, the calculation controlling circuit 10 outputs an A/D clock to the A/D converter 8 in synchronization with the conversion signal.

Thus, the A/D converter 8, in synchronization with the A/D clock, converts the voltage level being input from the sample and hold circuit 7 into digital measurement data, outputting the measurement data to the calculation controlling circuit 10.

The measurement data can be expressed as:

$$d2 = V2 - Vr2 + Vofs$$

where V2 denotes a value of voltage obtained by converting a current that is input to the input terminal IN(+) and that flows through the row line R2, and Vr2 denotes a reference value of voltage obtained by converting currents that flows through the row lines of the row-line set 3 other than the row line R2.

Similarly, as shown in FIG. 10C, at time t3, in order to carry out measurement relating to the next row line R3, the timing controlling circuit 9 outputs to the row-line selector circuit 5A such switching signals that cause the row line R3 to be connected to the output terminal S2 by the switch SSW3, and that cause the row lines R1, R2, R4, R5, . . . to the output terminal S1 by the switches SSW1, SSW2, SSW4, SSW5, . . . .

Thus, the row-line selector circuit 5A connects the row line R3 to the output terminal S2 by the switch SSW3, and connects the row lines R1, R2, R4, R5, . . . to the output terminal S1 by the switches SSW1, SSW2, SSW4, and SSW5.

Then, the timing controlling circuit 9 supplies a reset signal to the initial-stage C-V converting circuit 6B and 6C to initialize the initial-stage C-V converting circuits 6B and 6C so that the potentials of the row lines R1 to R5, are equalized.

The subsequent process is the same as the measurement process for time t2, except in that the subject of measurement is the row line R3.

The A/D converter 8, in synchronization with the A/D clock, converts the voltage level being input from the sample and hold circuit 7 into digital measurement data, outputting the measurement data to the calculation controlling circuit 10.

The measurement data can be expressed as:

$$d3 = V3 - Vr3 + Vofs$$

where V3 denotes a value of voltage obtained by converting a current that is input to the input terminal IN(+) and that flows through the row line R3, and Vr3 denotes a reference value of voltage obtained by converting currents that flow through the row lines of the row-line set 3 other than the row line R3.

The process described above is carried out until measurement is finished for all the row lines of the row-line set 3. That is, assuming that the row-line set 3 consists of n row lines R1 to Rn, measurement is carried out for each of the row lines R1 to Rn with the column line C1 activated by driving pulses.

Thus, in the calculation controlling circuit 10, measurement data d1 to dn corresponding to the capacitances at the respective intersections of the column line C1 and the row lines R1 to Rn are stored in relation to the column line C1.

Furthermore, in the measurement of each of the row lines, the initial-stage C-V converting circuit 6B outputs a reference voltage V(j) expressed as:

$$Vr(j)=k \cdot (Cr(j)/Cfr)$$

where Cr denotes the sum of the capacitances at the intersections of the (n−1) row lines of the row-line set 3 other than the row line R(j), and k denotes an amplification factor. Cr(j) denotes an average of capacitances at a large number of intersections, which is expected to be a substantially constant value. Thus, the reference voltage Vr(j) calculated according to the above equation is also a substantially constant value.

Furthermore, the initial-stage C-V converting circuit 6C outputs a measured voltage Vs expressed as:

$$Vs=k \cdot (Cs/Cf)$$

where Cs denotes the capacitance at intersection of the subject row line for measurement, and k denotes an amplification factor.

The differential detecting circuit 6A subtracts the reference voltage Vr(j) from the measured voltage Vs to obtain a difference voltage Vout, outputting the difference voltage Vout as a new measured voltage to the sample and hold circuit 7.

Thus, similarly to the first embodiment, in the calculation controlling circuit 10, for each column line, measurement data di for the respective row lines is sequentially stored.

However, in the third embodiment, since measurement data di is independent for each of the row lines, as opposed to the first and second embodiments, calculation of the capacitances at the intersections of the row lines by cumulative addition is not needed.

For example, when voltage data ds is obtained from measurement data di of the respective intersections, the measurement data di can be expressed as:

$$di=Vi-Vr1+Vofs$$

so that the voltage data can be expressed as:

$$ds=di+dr=Vi-Vr1+Vref+Vofs \approx Vi+Vofs$$

where reference data dr is a voltage Vref that is measured and set in advance, which is chosen to be substantially equal to the reference voltage Vr1, (i.e. Vr1≈Vref).

In the third embodiment, the row-line selector 5A shown in FIG. 9 may be divided into row-line selectors (5A1 to 5AM), as shown in FIG. 8.

That is, the row lines R1 to Rn of the row-line set 3 are divided into M groups, and each of the row-line selector circuits 5A1 to 5AM is associated with n/M row lines as a row-line group to be controlled.

Thus, the row-line selector circuits 5A1 to 5AM are respectively associated with initial-stage C-V converting circuits 6B1 to 6BM and 6C1 to 6Cm, differential detecting circuits 6A1 to 6AM, and sample and hold circuits 71 to 7M.

The subsequent-stage selector circuit 11 carries out switching as to which of the voltage levels held by the sample and hold circuits 71 to 7M is to be converted (A/D converted) into digital data.

The subsequent process for obtaining measurement data is the same as that in the second embodiment, and the method of calculating voltage data ds corresponding to capacitances at intersections from the measurement data has been described earlier.

The process of detecting capacitance may be carried out by recording a program for implementing the functions of the processing units shown in FIGS. 1, 8, and 9 on a computer-readable recording medium, causing a computer system to read the program from the recording medium and to execute the program. A "computer system" herein covers an OS, and hardware such as peripheral devices. Also, a "computer system" covers a WWW system having a Webpage providing or displaying environment. A "computer-readable recording medium" refers to a portable medium such as a flexible disk, a magneto-optical disk, a ROM, or a CD-ROM, or a storage device included in a computer system, such as a hard disk. A "computer-readable recording medium" also covers a device for storing a program for a certain period, such as a volatile memory (RAM) in a computer system that acts as a server or a client in a case where a program is transmitted via a network such as the Internet or a communication circuit such as a telephone circuit.

The program may be transmitted from a computer system storing the program in a storage device or the like to another computer via a transmission medium or transmission waves in the transmission medium. A "transmission medium" for transmitting the program herein refers to a medium that allows transmission of information, for example, a network (communication network) such as the Internet, or a communication circuit (communication line) such as a telephone circuit. The program may be a program implementing the functions only partially. Furthermore, the program may be what is called a difference file (difference program) that implements the functions in cooperation with a program already recorded in the computer system.

What is claimed is:

1. A capacitance detecting circuit for detecting, in terms of voltage, change in capacitance at intersections of a plurality of column lines and a plurality of row lines crossing each other, the capacitance detecting circuit comprising:
   column-line driving means for driving a column line;
   row-line selecting means for selecting a specific row line from the plurality of row lines; and
   a capacitance calculator for calculating a capacitance at an intersection of the specific rowline and the driven column line based on a reference current that flows in relation to a reference capacitance and a current that flaws in relation to the capacitance at the intersection,
   wherein the row-line selecting means selects a first row line and a second row line adjacent to each other,
   wherein the capacitance calculator includes
      differential-voltage outputting means for amplifying a difference between values of currents corresponding to capacitances at respective intersections associated with the first and second row lines, and outputting the amplified difference as a differential voltage signal; and calculating means for calculating values of voltages corresponding to capacitances at intersections based on differential voltage signals sequentially input to the calculating means, wherein the row-line selecting means, in a first detecting period, selects a line connected to the reference capacitance as a first row line, and a row line adjacent to the first row line as a second row line, wherein the row-line selecting means, in and after a second detecting period, selects row lines adjacent to each other from the plurality of row lines as first and second row lines, and wherein the calculating means cumulatively adds differential voltage signals sequentially input thereto, thereby obtaining voltage values corresponding to capacitances at intersections.

2. The capacitance detecting circuit according to claim 1, wherein the row-line selecting means, in and after the second detecting period, sequentially selects row lines adjacent to each other as first and second row lines, successively to the first and second row lines selected in the first detecting period.

3. The capacitance detecting circuit according to claim 1, wherein the plurality of row lines is divided into row-line groups, the row-line selecting means and the differential-voltage outputting means are provided individually for each of the raw-line groups, and the calculating means calculates values of voltages corresponding to the capacitances at the intersections individually for each of the row-line groups.

4. A fingerprint sensor comprising the capacitance detecting circuit according to claim 1.

5. A capacitance detecting circuit for detecting, in terms of voltage, change in capacitance at intersections of a plurality of column lines and a plurality of row lines crossing each other, the capacitance detecting circuit comprising:
  column-line driving means for driving a column line;
  row-line selecting means for selecting a specific row line from the plurality of row lines; and
  a capacitance calculator for calculating a capacitance at an intersection of the specific row line and the driven column line based on a reference current that flows in relation to a reference capacitance and a current that flows in relation to the capacitance at the intersection,
  wherein the row-line selecting means selects a first row line and a second row line adjacent to each other,
  wherein the capacitance calculator includes
    differential-voltage outputting means for amplifying a difference between values of currents corresponding to capacitances at respective intersections associated with the first and second row lines, and outputting the amplified difference as a differential voltage signal; and
    calculating means for calculating values of voltages corresponding to capacitances at intersections based on differential voltage signals sequentially input to the calculating means,
  wherein the column-line driving means outputs a signal that rises to a first voltage and then falls to a second voltage to the column line, and wherein when the column line is driven by the first voltage, the differential-voltage outputting means outputs a third voltage corresponding to a current that charges the capacitances at the intersections, and when the column line is driven by the second voltage, the differential-voltage outputting means outputs a fourth voltage corresponding to a current that discharges the capacitances at the intersections.

6. A capacitance detecting circuit for detecting, in terms of voltage, change in capacitance at intersections of a plurality of column lines and a plurality of row lines crossing each other, the capacitance detecting circuit comprising:
  column-line driving means for driving a column line;
  row-line selecting means for selecting a specific row line from the plurality of row lines; and
  a capacitance calculator for calculating a capacitance at an intersection of the specific row line and the driven column line based on a reference current that flows in relation to a reference capacitance and a current that flows in relation to the capacitance at the intersection,
  wherein the row-line selecting means selects, as the specific row line, a row line connected to an intersection that is a subject of measurement, and wherein the capacitance calculator includes
  row-voltage outputting means for converting a value of a current that flows in relation to a capacitance at the intersection into a value of a measured voltage, and outputting the value of the measured voltage;
  reference-row-line selecting means for selecting row lines other than the specific row line;
  reference-voltage generating means for converting a value of a current that flows in relation to a reference capacitance into a value of a reference voltage, the reference capacitance being a sum of capacitances at a plurality of intersections of the row lines other than the specific row line and the driven column line, and for outputting the value of the reference voltage; and
  calculating means for amplifying a difference between the value of the measured voltage and the value of the reference voltage to calculate a value of a voltage corresponding to the capacitance at the intersection.

7. The capacitance detecting circuit according to claim 6, wherein an amplification factor of the reference-voltage generating means is controlled to be substantially $1/(n-1)$ of an amplification factor of the row-voltage outputting means, where n denotes the number of the row lines other than the specific row line.

8. A fingerprint sensor comprising the capacitance detecting circuit according to claim 6.

9. A capacitance detecting method for detecting, in terms of voltage, change in capacitance at intersections of a plurality of column lines and a plurality of row lines crossing each other, the capacitance detecting method comprising:
  a column-line driving step of driving a column line;
  a row-line selecting step of selecting a specific row line from the plurality of row lines; and
  a capacitance calculating step of calculating a capacitance at an intersection of the specific row line and the driven column line based on a reference current that flows in relation to a reference capacitance and a current that flows in relation to the capacitance at the intersection
  wherein the row-line selecting step selects a first row line and a second row line adjacent to each other, and
  wherein the capacitance calculating step includes
    differential-voltage outputting step of amplifying a difference between values of currents corresponding to capacitances at respective intersections associated with the first and second row lines, and outputting the amplified difference as a differential voltage signal; and
    calculating step of calculating values of voltages corresponding to capacitances at intersections based on differential voltage signals sequentially input to the calculating means, wherein the row-line selecting step, in a first detecting period, selects a line connected to the reference capacitance as a first row line, and a row line adjacent to the first row line as a second row line, wherein the row-line selecting step, in and after a second detecting period, selects row lines adjacent to each other from the plurality of row lines as first and second row lines, and wherein the calculating step cumulatively adds differential voltage signals sequentially input thereto, thereby obtaining voltage values corresponding to capacitances at intersections.

* * * * *